United States Patent
Sharma et al.

(10) Patent No.: US 9,549,081 B1
(45) Date of Patent: Jan. 17, 2017

(54) PREDICTIVE DISCONNECT IN AN OFFLINE CHARGING SYSTEM

(71) Applicants: Alcatel-Lucent USA Inc., Murray Hill, NJ (US); Alcatel Lucent, Boulogne Billancourt (FR)

(72) Inventors: Ranjan Sharma, New Albany, OH (US); Maryse Gardella, Nozay (FR)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/979,689

(22) Filed: Dec. 28, 2015

(51) Int. Cl.
*H04M 15/00* (2006.01)
*H04W 4/26* (2009.01)
*H04W 76/06* (2009.01)

(52) U.S. Cl.
CPC ............. *H04M 15/65* (2013.01); *H04M 15/62* (2013.01); *H04W 4/26* (2013.01); *H04W 76/068* (2013.01)

(58) Field of Classification Search
CPC ........ H04M 15/65; H04M 15/62; H04W 4/26; H04W 76/068
See application file for complete search history.

*Primary Examiner* — Dinh P Nguyen
(74) *Attorney, Agent, or Firm* — Niraj A. Desai (57) ABSTRACT

System and method for implementing a predictive disconnect in an Offline Charging System of a telecommunications network are provided. In one aspect, an apparatus for implementing a charging function in the OFCS is configured to determine that a resource allocated to the OFCS for processing messages received from one or more Charging Trigger Functions (CTFs) connected to the OFCS is experiencing or about to experience a bottleneck condition. The apparatus is configured to heuristically determine an expected duration of time for the resource to return to a normal condition, and is further configured to initiate a disconnection between the OFCS and one or more of the CTFs connected to the OFCS for at least the determined expected period of time.

20 Claims, 4 Drawing Sheets

Table 1. Resource, Attribute Threshold, Traffic Arrival Pattern, and Connection Suspension Heuristic Polices

| Scenario | Selected Resource | Selected Resource Attribute Threshold | Input arrival Attribute: Engineered limit | Selected Resource Availability | Expected duration for return to normalcy (Recovery Period) | Buffer (as a function of confidence level) | Retry Duration (Adjusted Recovery Period) |
|---|---|---|---|---|---|---|---|
| 1 | CPU | 80% | 120% | 100% | t1 | 10% | t1+10% |
| 2 | CPU | 90% | 130% | 100% | t2 | 15% | t2+15% |
| 3 | CPU | 90% | 110% | 80% | t3 | 15% | t3+15% |
| 4 | CPU | 95% | 135% | 100% | t4 | 18% | t4+18% |
| 5 | Memory | 80% | 110% | 100% | t5 | 10% | t5+10% |
| 6 | Memory | 85% | 120% | 100% | t6 | 15% | t6+15% |
| 7 | Memory | 90% | 125% | 100% | t7 | 18% | t7+18% |
| 8 | Memory | 95% | 130% | 100% | t8 | 20% | t8+20% |
| 9 | Storage | .. | | | | | |

PREDICTIVE DISCONNECT IN AN OFFLINE CHARGING SYSTEM

TECHNICAL FIELD

The present disclosure is directed towards communication systems, and in particular, to offline charging functions in telecommunication systems.

BACKGROUND

Telecommunication service providers typically provide numerous voice and data services to end users (also referred to as subscribers of a telecommunication network). Some examples of voice services include voice calls, call forwarding, call waiting, etc. Some examples of data services include messaging, streaming audio/video, Voice over Internet Protocol (VoIP), online gaming, and IP-TV. The data services are managed by a Packet Core network of a telecommunications provider, which interfaces the end user with external Packet Data Networks (PDN), such as the Internet. Some examples of Packet Core networks include General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the voice or data services of a telecommunication network via an over the air interface with one or more base stations.

Telecommunication service providers use offline and online charging systems to keep track of the resource/services usage incurred by each subscriber user device of the telecommunication network. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

As provided in 3GPP TS 32.240, offline charging is defined as a group of functions where charging information for network resource usage is collected concurrently with the resource usage. An Offline Charging System (OFCS) of the telecommunication network processes charging information through a chain of charging functions that are part of the OFCS, which results in the generation of Charging Data Record (CDR) files that are transferred from the OFCS to the network operator's Billing Domain for subscriber billing and/or inter-operator accounting. Charging information is provided by a Charging Trigger Function (CTF) that is implemented in a network element (NE) configured to provide services to a subscriber via the telecommunications network. The CTF collects charging information pertaining to chargeable events associated with various services provided by the telecommunications network to the subscriber's user device, assembles this information into matching charging messages, and sends the charging messages to the OFCS, which processes the information and generates CDRs that are sent to the billing domain.

However, a number of constraints may limit or reduce the performance of the OFCS in processing charging information received from CTFs connected to the OFCS. A constraint or strain in the resources used to implement one or more functions implemented in the OFCS can often have an adverse effect on being able to generate complete CDRs for services enabled by one or more Network Elements, which, in turn, typically results in significant potential revenue leakage for the telecommunication network provider. Thus, systems and methods that aid and/or improve the recovery process of an OFCS that is experiencing or about to experience a resource constraint are desirable.

BRIEF SUMMARY

In various aspects, systems and methods for processing messages in an Offline Charging System of a telecommunications network are provided.

In one aspect, a system and method include determining that a resource allocated to the OFCS for processing offline charging messages received from one or more Charging Trigger Functions (CTFs) connected to the OFCS is experiencing a bottleneck condition based on a measured or estimated attribute of the resource; determining an expected duration of time for the resource experiencing the bottleneck condition to return to a normal condition; and, transmitting an enhanced Disconnect Peer Message (eDPR) including the expected duration of time to one or more CTFs requesting that the one or more CTFs are to disconnect and to stop sending offline charging messages to the OFCS for at least the expected duration of time.

In one aspect, the system and method further includes determining the expected duration of time in part based on a determined confidence score.

In one aspect, the system and method further includes determining that the resource experiencing the bottleneck condition has returned to the normal condition within the expected duration of time; and, increasing the confidence score based on the determination that the resource experiencing the bottleneck condition returned to the normal condition within the expected duration of time.

In one aspect, the system and method further includes determining that the resource experiencing the bottleneck condition has not return to the normal condition within the expected duration of time; and, decreasing the confidence score based on the determination that the resource experiencing the bottleneck condition did not return to the normal condition within the expected duration of time.

In one aspect, the system and method further includes periodically adjusting the expected duration of time based on the confidence score.

In one aspect, the system and method further includes determining the expected duration of time as a range including a minimum expected duration of time and a maximum expected duration.

In one aspect, the system and method further includes heuristically determining the expected duration of time for the resource to return to the normal condition.

In one aspect, the system and method further includes determining the expected duration of time for the resource to return to a normal condition based on a monitored or measured attribute of one or more other resources allocated to the OFC.

In one aspect, the system and method further includes transmitting the eDPR message to the one or more CTFs using Diameter protocol.

In one aspect, the system and method further includes providing an enumeration in the eDPR message for indicating the inclusion of the expected duration of time in an Address-Value-Pair field of the eDPR message to the one or more CTFs.

DETAILED DESCRIPTION

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Offline Charging System (OFCS) provides the basis for post-paid billing for services rendered by telecommunication service providers, where subscribers are charged at the end of their billing cycle according to their usage of one or more services. Various network elements (NEs) implementing an integrated Charging Trigger Function (CTF) connect with and provide charging information to the OFCS for services rendered to one or more telecommunication subscribers' User Equipment (UE). The OFCS receives the information regarding the chargeable events from one or more CTFs and generates CDRs based on the chargeable information. A CDR is a formatted collection of information about a chargeable event (e.g., time of call set-up, duration of the call that can be derived based on embedded time stamps in the record, amount of data transferred, etc.) for use in billing and accounting. CDRs pertaining to a particular session may be aggregated and correlated into a consolidated CDR file, which is made available to the billing domain for charging subscribers for various services and/or sessions provided by the telecommunications network.

Communications between the NE/CTFs and the OFCS occur via messages in accordance with the Diameter Protocol which is defined by the Internet Engineering Task Force (IETF) in RFC 6733 (which supersedes RFC 3588). Charging related messages (whether event-based or session-based) are provided by NEs to the OFCS in Accounting Request Messages (ACRs) using the Diameter Protocol. ACRs are used for both session-related and event-related charging/accounting. ACRs, and their responses, ACAs, consist of a Diameter Protocol header and a number of attribute-value pairs (AVPs) which form the data portion of the messages.

The OFCS is engineered to handle a certain volume of messages or traffic. Typical inputs that are considered while engineering the capacity of a OFCS include subscriber count, number of NE/CTFs expected to be serviced, network characteristics, average durations of the voice or data sessions, amount of processing and storage, and the like, which are used to implement or allocate one or more of the physical resources for the various OFCS functions, including the Charging Data Function (CDF) and the Charging Gateway Function (CGF), which are collectively referenced as the Charging Collection Function (CCF) of the OFCS.

A CCF can exhibit several bottlenecks, as the systems that implement the functions of the OFCS are provided with a finite amount of physical resources such as processing capacity (number of CPUs, cores per CPU, threads per core), primary memory, secondary memory, queues, etc. For instance, calls or sessions that are associated with a long duration often run against the memory bottleneck, whereas short duration calls tend to run against the CPU utilization limits. In some cases, the link bandwidth between the NE/CTF and the CCF can become a bottleneck, and in yet other situations, the storage space on the CCF can be the bottleneck.

A protective mechanism is provided in IETF RFC 6733 for a CCF that encounters an issue that impacts its performance or ability to process or keep up with traffic. In particular, this mechanism enables a CCF to transmit a disconnect request message to one or more CTFs using the Diameter Protocol. The Diameter disconnect request message is known as the Disconnect-Peer-Request message, or a DPR message. A CCF may also transmit a DPR message to a CTF for other reasons, such as when the CCF is about to reboot or restart. The DPR message indicates to the CTF that the CCF intends to indefinitely disconnect the connection between the CCF and the CTF (e.g., to alleviate a potential or ongoing overload condition). It also indicates that the CTF is to stop sending messages (including ACR messages) to the CCF whether for new or for ongoing sessions.

A CTF that receives a DPR message responds with a Diameter Disconnect-Peer-Answer (DPA) message that acknowledges receipt of the DPR message back to the CCF. Upon receiving the DPA message, the CCF initiates disconnect between itself and the NE, which is configured to take action at its end in view of the end of the connection between itself and the OFCS. In a small set of circumstances, the DPA sent from the NE back to the OFCS may include an error notification to avoid a race condition that may occur for messages that were already forwarded by the CTF to the CCF, and are likely in transit to the CCF. However, the normal operation for the NE in either case is to acknowledge the DPR by sending a DPA, connect with a new peer CCF (if available), and to transmit charging messages (for new and ongoing sessions) to the new peer CCF.

The conventional mechanism described above and set forth in RFC 6733 can protect an overloaded CCF from being further overloaded with additional traffic/processing work load, but it also enables a number of adverse effects. For example, a CTF that receives the DPR message typically establishes a new connection to a new peer CCF (if available). This typically results in a split of charging messages for ongoing sessions, because some charging messages for the sessions are sent to a first CCF, whereas after receipt of the DPR message from the first CTF, other or remaining charging messages for those ongoing sessions are now sent to a second (new) CCF. As one or ordinary skill in the art will appreciate, such split of charging messages for one or more sessions to different CCFs causes both the first CCF and the second CCF to generate tens of thousands of incomplete CDR records for the many thousands of sessions that are typically in progress in the telecommunications network at a given time. Since correlation and resolution of thousands upon thousands of incomplete CDR messages itself strains the processing resources of the billing domain and adds to the cost, some telecommunications network providers choose to simply discard or disregard the incomplete CDR messages, which effectively results in a significant revenue leakage for the services that are provided to subscribers over the telecommunications network.

Additionally, the conventional DPR message also serves to indicate to the receiving CTF that it should not attempt to reconnect to a CCF from which it received the DPR message. The purpose of preventing a CTF from trying to reconnect to a CCF from which it received a DPR is understandable as a means for protecting an already overloaded CCF from further exacerbation caused by repeated requests for reconnection from one or more CTFs. However, it can also cause an adverse consequence where a CTF that receives multiple DPRs from multiple CCFs over time eventually simply runs out of CCFs with which it can attempt to connect for essentially an indefinite period of time.

The present disclosure is directed to systems and methods that may enhance the protective mechanism of the CCF by preventing or alleviating the issues identified above.

Figure 1:
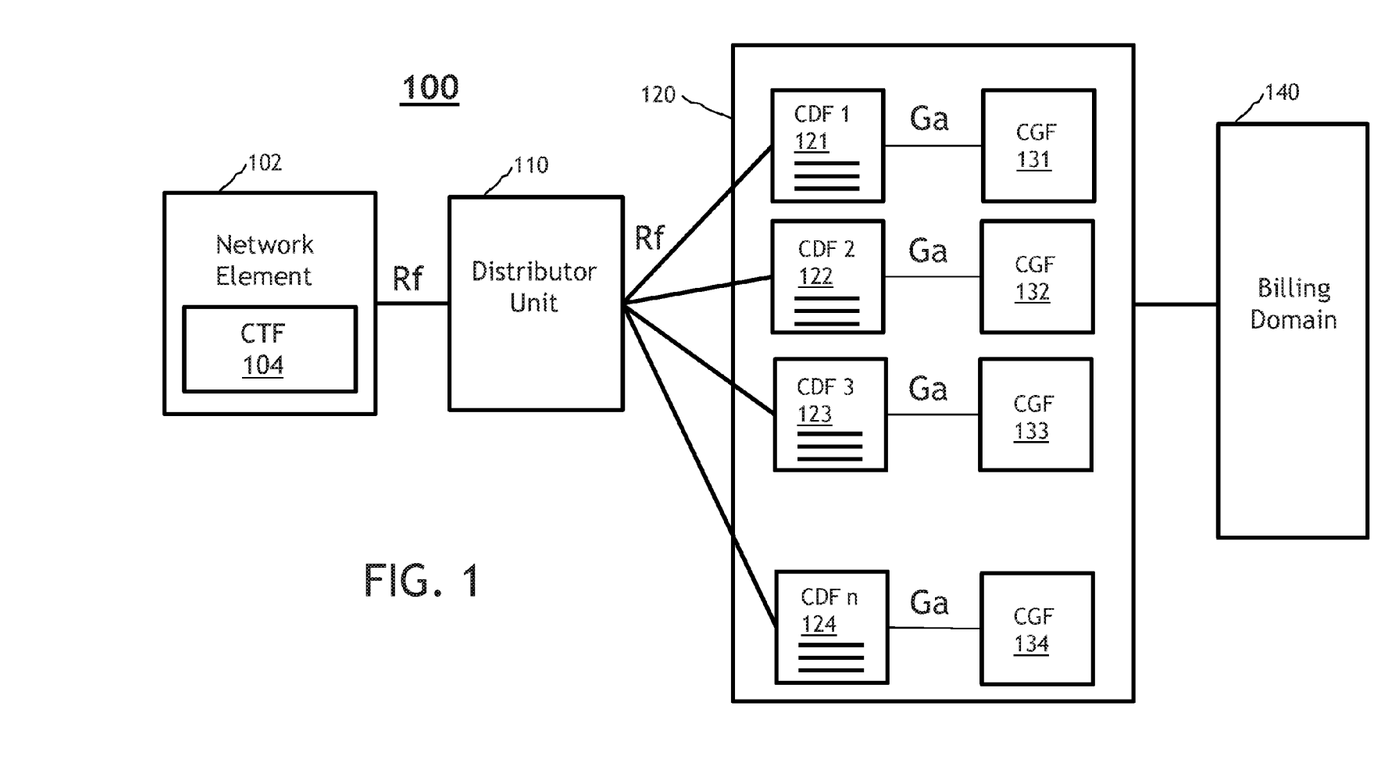
FIG. 1 illustrates an example embodiment of an offline charging architecture.

FIG. 1 illustrates an example embodiment of an offline charging architecture 100 in accordance with various aspects of the disclosure. Architecture 100 may be implemented in a circuit-switched network or a packet-switched network that provides services to its subscribers (i.e., end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes a network element 102 that connects to an Offline Charging System (OFCS) 120 through a distributor unit 110 (optional). A network element 102 is an apparatus or equipment used in the provision of services provided by a network to subscriber UEs. For example, in various embodiments a network element may comprise a Serving-Call Session Control Function (S-CSCF), an application server (AS) of an IMS network, a Serving Gateway (SGW) or a Packet Data Network Gateway (PGW) of an LTE network, etc. Network element 102 includes a Charging Trigger Function (CTF) unit 104 that detects chargeable events for services provided by network element 102, assembles information for the chargeable events into matching charging events, and sends the charging events to a Charging Data Function (CDF) of the OFCS 120. In the case of network element 102, CTF 104 uses a Diameter Rf interface. Therefore, CTF 104 assembles the charging information into accounting requests, such as one or more Diameter Rf Accounting Request messages (ACRs). Although one CTF 104 is illustrated in FIG. 1 for simplicity, in typical applications there can be many CTFs ($104_1$ . . . $104_N$) that are connected to the CDFs of the OFCS 120.

OFCS 120 is an apparatus, a server, a device, or a collection of processing equipment configured to implement offline charging for sessions or services provided by a telecommunications network. Offline charging can be of two types: session based or event based. In event based charging (i.e., session-less charging), the CTF reports the usage or the service rendered where the service offering is rendered in a single operation, such as subscriber registration, re-registration, de-registration, etc. The CTF reports session-less events in an Accounting Request Event message (ACR Event). Session based charging is the process of reporting usage reports for an entire service session that is provided over a duration of time. The CTF reports session messages as ACR Start, ACR Stop, and ACR Interim messages that denote the start, end, and interim session accounting data for charging for the type and duration of the session. During a session that starts with an ACR Start message and ends with an ACR Stop message, the CTF may transmit multiple ACR Interim messages depending on the proceeding of the session.

As shown in FIG. 1, OFCS 120 includes a plurality of CDFs (CDF1-CDFn) 121-124. A CDF comprises a processing apparatus, unit, or module within OFCS 120 that receives charging events for one or more sessions from one or more CTFs. The CDF processes the received charging events to generate one or more CDRs for the sessions, and sends the CDRs to one or more Charging Gateway Functions (CGFs 131-134). A CGF comprises a processing apparatus, unit, or module within OFCS 120 that correlates CDRs for a session, and forwards a CDR file with the correlated CDRs to a billing domain 140. Billing domain 140 is the part of the operator network that receives and processes the session correlated CDR files for billing mediation and other billing applications (e.g., statistical applications).

CDFs 121-124 in OFCS 120 communicate with CGFs 131-134 over a Diameter Ga interface. In the case shown in FIG. 1, GTP' is used on the Ga interface to transport CDRs from the CDFs to the CGFs. A CDF (e.g., CDF 121) interconnected to a CGF (e.g., CGF 131) is collectively referenced herein as a Charging Collection Function (CCF). While a 1:1 relationship is shown between CDFs 121-124 and CGFs 131-134 in FIG. 1, an N:M relationship is also possible. Although not specifically illustrated in FIG. 1, OFCS 120 may include one or more processors or other hardware components for implementing CDFs 121-124 and CGFs 131-134.

Distributor unit 110 is an optional component that may be implemented between the CTFs (e.g., CTF 104) and the CDFs 121-124 in OFCS 120. The purpose of distributor unit 110 is to distribute Diameter requests or charging information messages (e.g., ACRs) from CTFs to the multiple CDFs 121-124 within OFCS 120. In this embodiment, distributor unit 110 is configured for communicating via Diameter Rf protocol. Although distributor unit 110 is illustrated as being outside of OFCS 120, in some embodiments the distributor unit 110 may be integrated into the OFCS 120.

The task of distributing Diameter requests may include considering the weights, current load index, and other parameters of CDFs 121-124 to select a destination CDF instance for handling ACRs for a particular session. Distributor unit 110 may follow a round-robin strategy in selecting a queue 150 associated with a selected destination CDF for a particular session. Distributor unit 110 may work as a Back to Back User Agent (B2BUA), where Diameter sessions associated with a particular CTF are terminated on distributor unit 110, and equivalent and corresponding Diameter sessions are started between distributor unit 110 and a selected destination CDF 121-124. Each CTF 104 may have established a Diameter connection with distributor unit 110, and send a Diameter ACR to distributor unit 110 that includes a Diameter "SessionId". The Diameter "SessionId" is unique for the CTF for each session it reports.

The distributor unit 110 may be configured to use a distribution algorithm to distribute ACRs associated with particular ACR Sessions to particular CDFs. A distribution algorithm comprises any set of rules for determining a destination CDF for ACRs for particular sessions. In one embodiment, distributor unit 110 may use a "consistent hashing" algorithm to select a destination CDF for a particular Diameter session. The consistent hashing algorithm may use "SessionId" information included in the ACRs (e.g., Diameter requests) to select the destination CDF and queue for a given Diameter request. For example, with n CDFs present each providing an m number of interfaces to CDFs 121-124, the consistent hashing algorithm may generate M numbers for a given Diameter "SessionId", where M may be n times m. The destination CDF and associated with the highest of the numbers may be chosen for processing CDRs of the Diameter session.

OFCS 120 may be implemented using a blade system architecture, such that each or any combination of the CDFs 121-124, and CGFs 131-134 (i.e., CCFs) may be implemented to execute on respective blades (or servers) of a server chassis, where each blade includes physical computing resources such as a processor, memory, input/output devices, or other components typically found in computing devices. One or more message queues (as depicted by horizontal lines within CDFs 121-124) may be implemented on the blades to provide a queue message communication interface between the components of the OFCS 120, such as, by way of example only, the distributor unit 110 executing on one of the blades of the server chassis and one or more CDFs executing on other respective blades of the server chassis.

Figure 2:
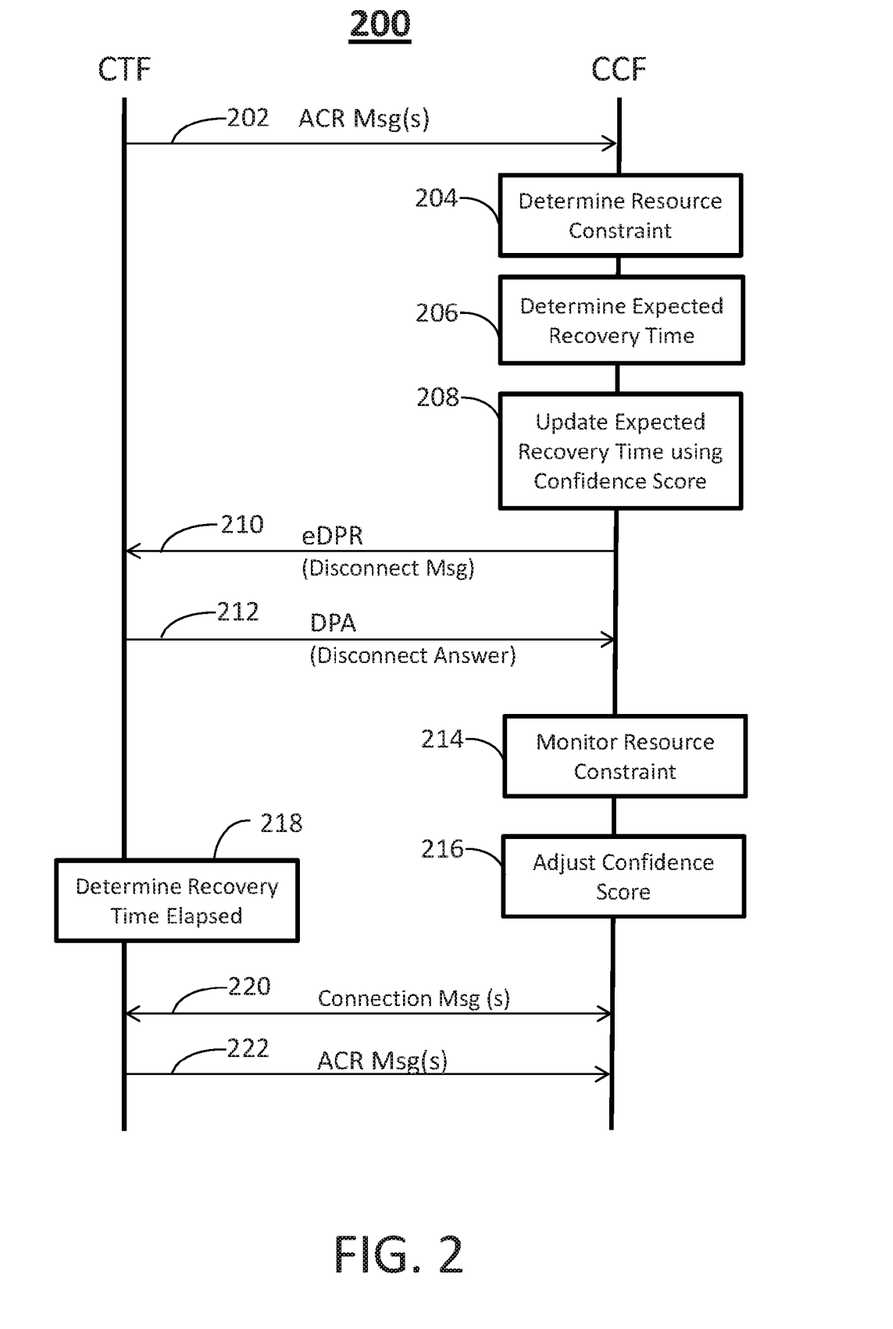
FIG. 2 illustrates an example of a predictive disconnect process for processing session based messages in accordance with various aspects of the disclosure.

FIG. 2 illustrates an exemplary process 200 in accordance with various aspects of the disclosure, which is now described in conjunction with architecture 100 of FIG. 1.

The steps of process 200 will be described with reference to the CDFs 121-124 of the OFCS 120 illustrated in FIG. 1, but those skilled in the art will appreciate that process 200 may be performed in other systems or functional units of the OFCS 120. Although the steps are described in a particular order to facilitate understanding of various aspects of the disclosure, it will be readily apparent to those of ordinary skill that in other embodiments more steps may be added, or certain steps may be omitted, modified, combined, or performed in a different order in view of the disclosure.

To begin, it is assumed that each CTF 104 is connected to a CCF of the OFCS 120 and detects chargeable events for a session based service provided by a network element 102 (see FIG. 1). The CTF 104 assembles charging information for the event into a Diameter Rf ACR (e.g., Diameter request) for a Diameter session. The type of accounting for the service is further assumed to be session based, so a CTF 104 may insert a "START" value in the Accounting-Record-Type AVP of the ACR for new sessions, and insert an "INTERIM" or a "STOP" value in the Accounting-Record-Type AVP of the ACR for subsequent chargeable events for the sessions. CTF 104 then sends the ACRs (i.e., Diameter Rf Accounting Requests) to a CDF (e.g., CDF 121) of the OFCS directly or via the optional distributor unit 110. It is further assumed that the optional distributor unit 110 receives ACRs for sessions from different CTFs 104, and distributes the ACRs to CDFs 121-124 of the OFCS 110, based on, for example, session IDs of the ACRs and other considerations described above, for further processing of ACRs for particular sessions from particular CTFs by particular CDFs.

Turning now to process 200 of FIG. 2, in step 202 a receiving CCFs (e.g., one of the CDFs 121-124) receives and processes Diameter messages (including Diameter ACRs for one or more sessions) from each CTF to which it is connected. The receiving CDF may receive the Diameter messages either directly from the one or more connected CTFs (e.g., one or more CTFs 104) or may receive them via an optional distributor unit (e.g., distributor unit 110) illustrated in FIG. 1.

In step 204, the receiving CDF determines that a resource allocated to the OFCS (e.g., the receiving CDF or an interconnected CGF) is experiencing a resource constraint (i.e., a bottleneck condition).

For example, the receiving CDF may be configured to monitor or measure an attribute of one or more resources that are used to implement the CCF, such as physical inputs, physical outputs, physical memory, physical CPUs (including CPU cores), processes, threads, network or database connections etc. The measured or monitored attribute may be different for different types of resources, and may include a measured or monitored rate of change. For instance, the measured attribute for a CPU may be its utilization, speed, temperature, etc. The measured attribute for a memory or a queue may be its consumption, such as amount used or amount available, or the rate of change of such amounts. The measured attributes for threads, processes, network or database connections may be latency, throughput, bandwidth, size, number of instances, etc. Other types of appropriate attributes that directly or indirectly represent performance metrics of the allocated resources of the CCF may also be measured, such as the amount of charging messages that are being received at the CCF, the rate at which the received charging messages are being processed by the CCF, and the like. Various known attributes of one or more resources of the CCF may be measured using conventional software or hardware performance monitoring tools, as will be understood by one of ordinary skill in the art.

The receiving CDF may determine that a resource allocated to the CCF is experiencing a bottleneck condition if the measured or monitored attribute of a resource is outside a designated range, or above or below a designated threshold that represents a predetermined normal condition for that resource. For example, various thresholds or ranges may be determined for different attributes of one or more selected resources, and if the monitored use or rate of change in the attribute of the selected resource is determined to be above or below a designated threshold, as appropriate, the CDF may be configured to determine that that resource is experiencing or about to experience a bottleneck condition that will impact the performance of the CCF.

In step 206, the receiving CDF determines an expected duration of time for the resource that is allocated to the CCF to return (or recover) to a normal condition from the determined bottleneck condition. The expected duration of time may also be referenced herein as the recovery period or time, by which time it is estimated that the resource will return to the normal condition (i.e., return within the designated parameters allocated to the attribute of the resource).

For example, each of the monitored or measured attributes of the one or more selected resources may be associated with one or more estimated time periods within which time a resource may be expected to return to normal condition based on the current workload. The time periods that are associated with an attribute of a selected resource may vary in proportion to determined severity of the bottleneck condition. Once the receiving CDF determines that an identified resource is experiencing a bottleneck condition, the receiving CDF may be configured to select an appropriate associated time period (e.g., based on severity) as the expected or estimated time duration (or recovery period) for the measured attribute of to return to normal condition under current load conditions. The severity of the bottleneck condition may be represented as how far the measured or monitored attribute is from the designated range or threshold.

By way of an example, the expected recovery period for a queue that is deemed to be 90% full and above a desired maximum threshold of 50% may be determined as the estimated time it will take to process the messages currently in the queue such that the consumption of the queue falls below the desired 50% threshold assuming that the rate of incoming messages into the queue is equal to the engineered limit at the current time. This time may be different (e.g., larger) than the recovery time determined for a queue that is 70% full to return to the normal condition of 50%. By way of another example, an expected recovery period may also be determined for a CPU's utilization value to fall below a designated threshold assuming the current workload were to equal the engineered workload limit. The expected recovery period may be relatively larger if the utilization rate of the CPU is farther outside the desired threshold, and smaller if the utilization rate is outside, but closer to the desired threshold. Similar expected recovery times may be determined for other selected resources to return to a normal condition under current workload conditions based on a measured or monitored value of an attribute of that selected resource.

While described as a single value, in one aspect the expected recovery period may also be a range. In accordance with this aspect, the expected recovery period may be indicated as a minimum expected recovery time and a maximum expected recovery time.

In step 208, the receiving CDF determines a confidence score for the determined expected duration of time and adjusts or updates the expected duration of time based on the confidence score. In one embodiment the confidence score may be implemented as a value (e.g., a percentage) indicating the degree of confidence that the resource experiencing the bottleneck condition will return to the normal condition within the determined expected period of time. For example, the receiving CDF may determine a confidence level of 60% for a determined expected duration of time. This value may be used to adjust the expected duration of time by increasing the expected duration of time by 40% (100%−60%=40%), for example. In some embodiments, the confidence score may also be implemented as a fixed or varying time period that is used to increment (or in appropriate cases decrement) the expected duration of time. In yet another embodiment where the expected recovery period is indicated as a range, the confidence score may be used to determine the maximum expected recovery time value, where the minimum expected recovery time may be the unadjusted value determined in step 206.

In step 210, the receiving CDF generates and transmits an enhanced Disconnect Peer Request (eDPR) message to one or more CTFs connected to the receiving CDF, where the eDPR message indicates the expected duration of time for the resource to return to the normal condition within the eDPR. The expected duration of time included in the eDPR indicates to the one or more CTFs a time period after which the disconnected CTFs may attempt to reconnect to the CCF. The eDPR Diameter message differs from the conventional PDR message in that the eDPR includes and notifies the CTF of the expected duration of time for the bottleneck condition to return to a normal, and, notably, indicates to the CTF a time period after which a CTF may attempt a reconnection with the CCF. In contrast, the conventional PDR message does not include nor provides any indication to the CTF of a time period after which the CTF may attempt to reconnect, and in fact serves to indefinitely disconnect the CTFs from the CCF, since the CTFs that receive the conventional PDR are discouraged from attempting to reconnect indefinitely.

In step 212, the receiving CDF receives a Disconnect Peer Answer (DPA) message from one or more CTFs acknowledging the receipt of the eDPR message. The receiving CDF disconnects the one or more CTFs from which the PDA messages are received.

In step 214 the receiving CDF monitors whether the constrained resource experiencing the bottleneck condition has returned to normal condition. For instance, the receiving CDF may periodically monitor or measure an attribute constraining the resource to determine whether the measured attribute has returned within the designated threshold, as may be expected to occur since the workload of the CCF will be reduced as a result of the disconnection of one or more CDFs from the CCF. A determination that the measured attribute is within the designated threshold or range may signify that the resource is no longer deemed to be in a bottleneck condition, and has returned to normal condition. If the resource has not returned to normal condition when a periodic check is made, the receiving CDF may continue to monitor or measure the attribute of the resource periodically till a determination is made that the resource has returned to normal condition.

In step 216, the receiving CDF updates or refines the confidence score associated with the expected duration of time based on whether the constrained resource has returned to normal condition or not. For instance, when it is determined that the resource has returned to normal condition, the time at which such determination was made may be noted. The confidence score may be increased in cases where the constrained resource is deemed to have returned to normal condition within the determined expected duration of time. Alternatively, the confidence score may be decreased if the constrained resource does not return to normal condition within the expected duration of time. The increase or decrease in the confidence score may be proportional to the time it takes for the resource to return to normal condition, or may be increased or decreased by a predetermined value or values.

In step 218, the one or more CTFs may determine that the expected duration of time reported in the eDPR has elapsed and attempt, and, in step 220, to reconnect to the receiving CDF by exchanging handshake messages in accordance with the Diameter Protocol. For instance, a CTF that was disconnected may wait till the expected duration of time indicated in the eDPR has expired, and, subsequently attempt to reconnect to the CCF (i.e., the receiving CDF) in a conventional manner. For instance, the CTF may be configured to select a random duration between the minimum and the maximum expected time for recovery. In case only the minimum expected time for recovery has been sent with the eDPR, the CTF may be configured to wait for at least that amount of time before attempting to connect with the CDF again. If the CTF is able to reestablish the connection with the CCF in step 220, in step 222 the CTF may resume sending Diameter ACR messages to the receiving CDF.

A number of advantages may be apparent from the description of process 200 above. To begin with, the process described above enables a CTF that receives an eDPR message with the specific option to attempt to reconnect to a CCF after the recovery time period indicated in the eDPR, in contrast to the conventional which provides no such mechanism. Furthermore, inclusion of the expected recovery period of time enables a CTF to determine whether it can wait for the time specified within the eDPR. This is important as it enables a CTF to hold Diameter messages for ongoing sessions with a CCF from which it has been disconnected, and to successfully reconnect with the CCF after the expected recovery period has elapsed, such that the CTF can resume transmission of Diameter messages to the same CCF, thus maintaining session continuity with the same CCF and avoiding the splitting of messages described above.

The CTF may determine whether to hold messages and wait for a reconnection to the same CCF or whether to establish a new connection with a new CCF based on the time indicated in the eDPR. For example, such determination may be made based the amount of time indicated in the eDPR and the workload conditions of the CTF itself, to determine whether it has the physical resources to hold the messages for at least the time indicated in the eDPR, or whether to establish another connection with a new peer CTF. Since overload conditions at a CCF can often be temporary as the CCF works thorough spikes in messages or resource consumption, successful reconnection of the CTF to the CCF can be expected, and further enabled by implementing (optionally) additional resources at the CTF to enable the CTF to hold messages for at least an average recovery time period.

In addition, the process disclosed above allows for a predictive disconnection between an OFCS that is experiencing or potentially about to experience an impact on its performance and one or more CTFs connected to the OFCS. By enabling a temporary disconnection between the OFCS and one or more CTFs when it appears that that traffic or other constraints might impact the performance of the OFCS, the OFCS may be able to better modulate its workload and resources to maintain a desired level of performance without allowing a resource allocated to the OFCS to become constrained such that ultimately the performance of the OFCS is affected.

Other embodiments may implement additional aspects. For instance in step 220, a situation may arise where a CTF that attempts to reconnect to a prior CCF after the recovery time expires may not be able to connect. This may arise, for example, if the CCF is still in an overloaded condition, even though the expected recovery time has elapsed. In this case, the CTF may be configured to wait an additional period of time before attempting to reconnect yet again. The additional time may determined as a factor of the expected recovery time received in the eDPR message resulting in the initial disconnection. For example, the CTF may be configured to wait for an additional time that is equal to (or a factor of) the expected recovery time that was received in the eDPR. The CTF may also be configured, after one or several failed attempts at reconnection, to establish a new connection with a new CTF.

A situation may also arise, where a receiving CDF determines, based on measured or monitored values of multiple attributes, that a multiple number for different resources are in a constrained or bottleneck condition. In this case, in step 206 (and 208), the receiving CDF may be configured to determine an overall expected recovery time by taking into account the expected recovery times (and confidence scores) associated with each of the constrained resources. For example, in one embodiment the receiving CDF may be configured to add the individual expected recovery times to determine an overall expected recovery time. Alternatively, the CDF may be configured to take the largest individual recovery time as the overall expected recovery time, or adjust the largest individual recovery time by a multiple based on the other individual expected recovery time, etc. The receiving CDF may also be configured to adjust each of the individual recovery times based on the respective confidence scores when determining the overall expected recovery time.

The receiving CDF may be configured to adjust the confidence score of each individual constrained resource by periodically monitoring or measuring values of one or more affected attributes of the individual resources, as described above.

The present disclosure contemplates an enhanced PDR message format that is different from the PDR message format as provided by the IETF. In one embodiment, the eDPR format includes an additional Address-Value-Pair (AVP) enumeration value, and an additional new AVP that indicates the expected recovery time. The general form of the eDPR message is shown below:

<DPR>::=<Diameter Header: 282, REQ>
{Origin-Host}
{Origin-Realm}
{Disconnect-Cause} (including the new enumeration value)
* [Various AVPs] (including a new AVP for the expected recovery period)

In accordance with this embodiment, the eDPR message is constructed by including a new enumeration value of "WAIT" in the existing Disconnect-Cause field (AVP code 273) of the PDR as follows: REBOOTING 0, BUSY 1, DO_NOT_WANT_TO_TALK_TO_YOU 2, WAIT 3. When the 'Wait' enumeration is provided in the Disconnect-Cause field, the CCF also includes a new AVP in the eDPR that includes the determined expected duration of time, as shown below:

Disconnect-Wait-Duration AVP::=<AVP Header: AVP Code TBD>
{Disconnect-Wait-Min-Duration}//AVP Code TBD
[Disconnect-Wait-Max-Duration]//AVP Code TBD Thus, the OFCS may provide the expected duration of time for the resource to return to normal condition as a range, which includes a minimum expected duration of time and a maximum expected duration of time. In particular, with reference to the new AVP illustrated above, the OFCS may provide the Disconnect-Wait-Min-Duration as a minimum expected recovery time period, and, optionally, the Disconnect-Wait-Max-Duration as the maximum expected recovery time period. The other fields of the eDPR may correspond to the conventional DPR format as shown above and as will be understood by one of skill in the art.

Upon receiving the 'Wait' directive in the eDPR, the NE/CTF may be configured to determine if it has sufficient buffer capacity to hold Diameter messages for at least Disconnect-Wait-Min-Duration, and if optionally provided, also for Disconnect-Wait-Max-Duration (as described above). Assuming it does, then the NE/CTF may choose a random value between the two timers and may attempt to re-establish the connection with the same CCF (via CER/CEA initiation, as described in section 2.1 of RFC 6733). One purpose of this embodiment in enabling the NE/CTF to randomly choose between a min and max values is to avoid a situation where multiple NE/CTFs all try to re-establish connection with the OFCS at the same time. Other embodiments may use other mechanisms without departing from the principles of the disclosure, as will be understood.

The receiving CCF (e.g., receiving CDF), on its side, can monitor the progress of recovery from the overload and modify the values in a heuristic table for the next occurrence of a similar overload. The CCF may refine the expected recovery duration values in the table upon occurrences of overload conditions over time, and in this manner achieve an adaptive or dynamic implementation that represents current or changing operating conditions.

Figure 3:
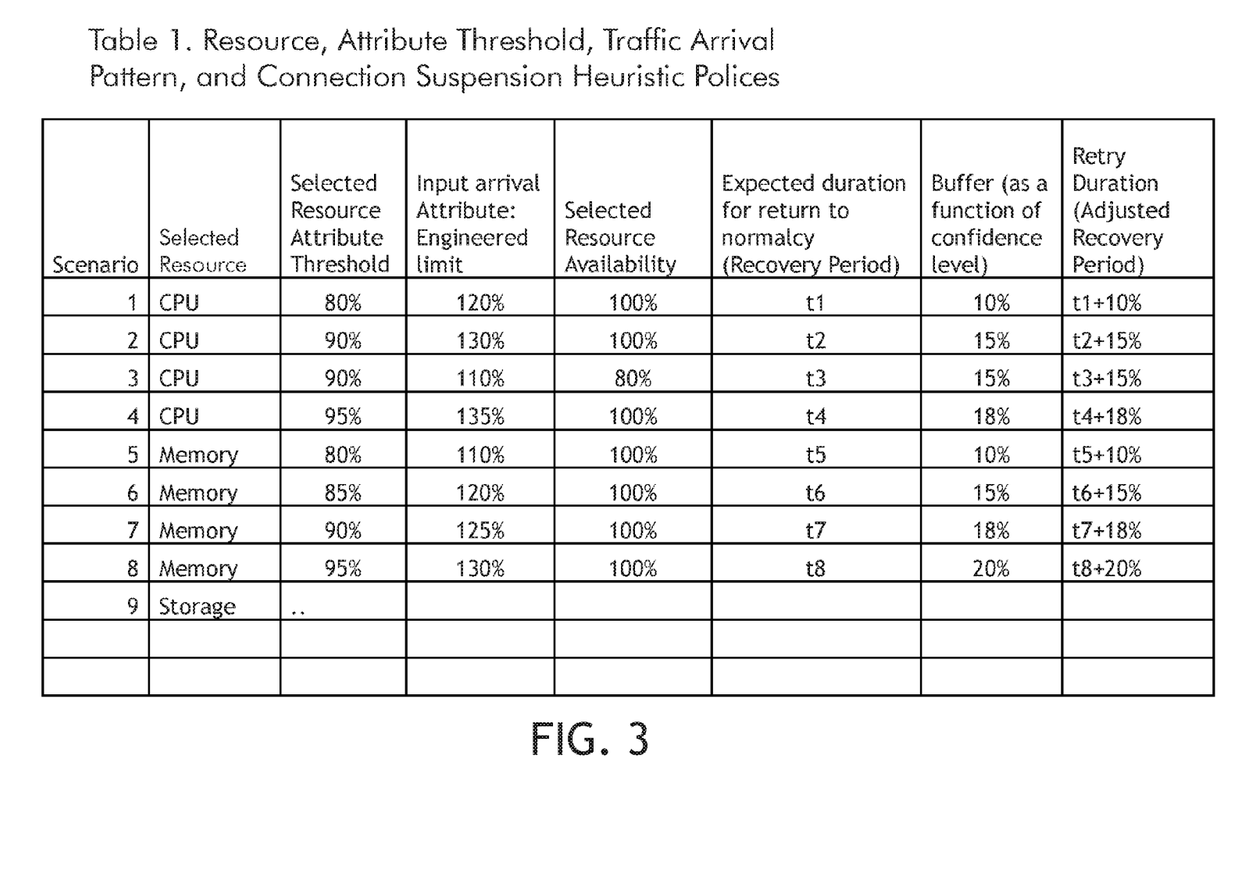
FIG. 3 shows an example in table format of policy information that may be stored in a CCF in accordance with one aspect of the disclosure

FIG. 3 shows an example in table format of policy information that may be stored in a CCF in accordance with one aspect of the disclosure. Table 1 shown in FIG. 3 illustrates a number of selected resources (e.g., CPU, memory, storage), traffic information, associated expected recovery period, etc. The CCF may maintain a multiple-row policy table, where a measured or monitored resource attribute may also be associated with a set of other measured or monitored resource attributes of other resources. The data in the policy table may be used to determine the expected recovery time for one or more constrained resources to return to normal operation given the measured or monitored attributes of other resources as shown in each row of the table. For instance, in a scenario indicated as "Scenario 1" in the table, when a receiving CDF determines that the CPU utilization has reached 80%, and the input arrival is at 120% of the engineered threshold, with all CPUs/cores/threads running, the CCF may estimate a recovery period of time t1, with a certain confidence level (e.g., 10%, which may be explicitly included in the table or not). Therefore, in the eDPR, the CCF may include an expected recovery time period that has been adjusted by the confidence score or level, as described above. The match with the values in the table may not need to be exact, and best-match approximation approaches may be used, as will be understood. As will be appreciated, the table shown in FIG. 3 illustrates just one of the many possible ways in which the policy table may be constructed. As will be understood, the policies included in the table may include policies as simple as one for a single attribute of a single resource, to complex policies covering various combinations of multiple attributes for multiple resources without departing from the principles of the disclosure. In one aspect the data in the policy table may be manually populated based on monitored performance of the OFCS. In other aspects the data in the policy table may be heuristically determined or updated by the OFCS in an automated manner.

Figure 4:
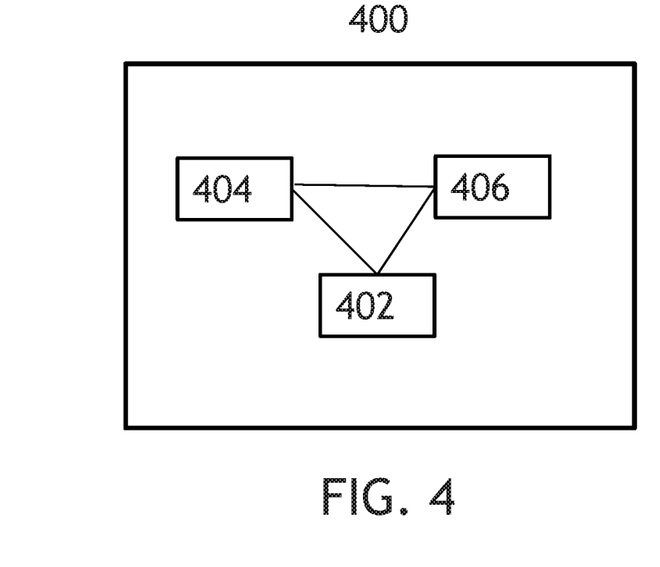
FIG. 4 illustrates a block-diagram example of an apparatus for implementing various aspects of the disclosure.

FIG. 4 depicts a high-level block diagram of a computing apparatus 400 suitable for implementing various aspects of the disclosure (e.g., one or more steps of process 200). Although illustrated in a single block, in other embodiments the apparatus 400 may also be implemented using parallel and distributed architectures. Thus, for example, one or more of the various units of architecture 100 of FIG. 1 discussed above, such as the NE 102, the CTF(s) 104, the distributor unit, the CDFs 121-124, the CGFs 131-134, and other components disclosed herein may be implemented using apparatus 400. Furthermore, various steps such as those illustrated in the example of process 200 may be executed using apparatus 400 sequentially, in parallel, or in a different order based on particular implementations. Exemplary apparatus 400 includes a processor 402 (e.g., a central processing unit ("CPU")), that is communicatively interconnected with various input/output devices 404 and a memory 406. Apparatus 400 may be implemented as one or more blades in a blade chassis.

The processor 402 may be any type of processor such as a general purpose central processing unit ("CPU") or a dedicated microprocessor such as an embedded microcontroller or a digital signal processor ("DSP"). The input/output devices 404 may be any peripheral device operating under the control of the processor 402 and configured to input data into or output data from the apparatus 400, such as, for example, network adapters, data ports, and various user interface devices such as a keyboard, a keypad, a mouse, or a display.

Memory 406 may be any type or combination of memory suitable for storing and accessing electronic information, such as, for example, transitory random access memory (RAM) or non-transitory memory such as read only memory (ROM), hard disk drive memory, database memory, compact disk drive memory, optical memory, etc. The memory 406 may include data and instructions which, upon execution by the processor 402, may configure or cause the apparatus 400 to perform or execute the functionality or aspects described hereinabove (e.g., one or more steps of process 200). In addition, apparatus 400 may also include other components typically found in computing systems, such as an operating system, queue managers, device drivers, database drivers, or one or more network protocols that are stored in memory 406 and executed by the processor 402.

While a particular embodiment of apparatus 400 is illustrated in FIG. 4, various aspects in accordance with the present disclosure may also be implemented using one or more application specific integrated circuits (ASICs), field programmable gate arrays (FPGAs), or any other combination of dedicated or programmable hardware.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. An apparatus for implementing an Offline Charging System (OFCS) of a telecommunications network, the apparatus comprising:
 a memory for storing instructions and data, and a processor configured to execute the instructions and to process the data, wherein the instructions, when executed by the processor, configure the processor to
  receive and process offline charging messages sent from a plurality of Charging Trigger Functions (CTFs) connected to the OFCS;
  determine that a resource allocated to the OFCS for processing the received offline charging messages is experiencing a bottleneck condition based on a measured or estimated attribute of the resource;
  determine an expected duration of time for the resource experiencing the bottleneck condition to return to a normal condition; and
  transmit an enhanced Disconnect Peer Message (eDPR) including the expected duration of time to one or more CTFs requesting that the one or more CTFs are to disconnect and to stop sending offline charging messages to the OFCS for at least the expected duration of time.

2. The apparatus of claim 1, wherein the processor is further configured to:
 determine the expected duration of time in part based on a determined confidence score.

3. The apparatus of claim 2, wherein the processor is further configured to:
 determine that the resource experiencing the bottleneck condition returned to the normal condition within the expected duration of time; and, increase the confidence score based on the determination that the resource experiencing the bottleneck condition returned to the normal condition within the expected duration of time.

4. The apparatus of claim 2, wherein the processor is further configured to:
determine that the resource experiencing the bottleneck condition did not return to the normal condition within the expected duration of time;
decrease the confidence score based on the determination that the resource experiencing the bottleneck condition did not return to the normal condition within the expected duration of time.

5. The apparatus of claim 2, wherein the processor is further configured to:
periodically adjust the expected duration of time based on the confidence score.

6. The apparatus of claim 1, wherein the processor is further configured to:
determine the expected duration of time as a range including a minimum expected duration of time and a maximum expected duration.

7. The apparatus of claim 1, wherein the processor is further configured to:
heuristically determine the expected duration of time for the resource to return to the normal condition based on one or more stored policies accessible to the processor.

8. The apparatus of claim 1, where the processor is further configured to determine the expected duration of time for the resource to return to a normal condition based on a monitored or measured attribute of one or more other resources allocated to the OFC.

9. The apparatus of claim 1, wherein the processor is configured to transmit the eDPR message using Diameter protocol.

10. The apparatus of claim 9, wherein the processor is configured to include an enumeration in the eDPR message for indicating the inclusion of the expected duration of time in an Address-Value-Pair field of the eDPR message to the one or more CTFs.

11. A method for processing offline charging messages in an Offline Charging System (OFCS) of a telecommunications network, the method comprising:
determining that a resource allocated to the OFCS for processing offline charging messages received from one or more Charging Trigger Functions (CTFs) connected to the OFCS is experiencing a bottleneck condition based on a measured or estimated attribute of the resource;
determining an expected duration of time for the resource experiencing the bottleneck condition to return to a normal condition; and
transmitting an enhanced Disconnect Peer Message (eDPR) including the expected duration of time to one or more CTFs requesting that the one or more CTFs are to disconnect and to stop sending offline charging messages to the OFCS for at least the expected duration of time.

12. The method of claim 11, further comprising:
determining the expected duration of time in part based on a determined confidence score.

13. The method of claim 12, further comprising:
determining that the resource experiencing the bottleneck condition returned to the normal condition within the expected duration of time; and,
increasing the confidence score based on the determination that the resource experiencing the bottleneck condition returned to the normal condition within the expected duration of time.

14. The method of claim 12, further comprising:
determining that the resource experiencing the bottleneck condition did not return to the normal condition within the expected duration of time;
decreasing the confidence score based on the determination that the resource experiencing the bottleneck condition did not return to the normal condition within the expected duration of time.

15. The method of claim 12, further comprising:
periodically adjusting the expected duration of time based on the confidence score.

16. The method of claim 11, further comprising:
determining the expected duration of time as a range including a minimum expected duration of time and a maximum expected duration.

17. The method of claim 11, further comprising:
heuristically determining the expected duration of time for the resource to return to the normal condition.

18. The method of claim 11, further comprising:
determining the expected duration of time for the resource to return to a normal condition based on a monitored or measured attribute of one or more other resources allocated to the OFC.

19. The method of claim 11, further comprising:
transmitting the eDPR message to the one or more CTFs using Diameter protocol.

20. The method of claim 11, further comprising:
including an enumeration in the eDPR message for indicating the inclusion of the expected duration of time in an Address-Value-Pair field of the eDPR message to the one or more CTFs.

* * * * *